United States Patent
Lee

(10) Patent No.: US 8,428,314 B2
(45) Date of Patent: Apr. 23, 2013

(54) FINGERPRINT-INITIATED NAVIGATING METHOD, METHOD FOR LINKING A FINGERPRINT AND A NAVIGATION DESTINATION, AND NAVIGATING DEVICE

(75) Inventor: Cheng-Kuo Lee, Hsichih (TW)

(73) Assignee: Wistron Corporation, Taipei Hsien (TW)

( * ) Notice: Subject to any disclaimer, the term of this patent is extended or adjusted under 35 U.S.C. 154(b) by 729 days.

(21) Appl. No.: 12/603,274

(22) Filed: Oct. 21, 2009

(65) Prior Publication Data

US 2010/0158328 A1 Jun. 24, 2010

(30) Foreign Application Priority Data

Dec. 19, 2008 (TW) ................................ 97149700 A

(51) Int. Cl.
*G06K 9/00* (2006.01)
(52) U.S. Cl.
USPC ........................................................ 382/124
(58) Field of Classification Search .................. 382/115, 382/124, 209, 218, 103; 283/68; 340/5.82, 340/5.83; 713/186; 902/3
See application file for complete search history.

(56) References Cited

U.S. PATENT DOCUMENTS

| | | | |
|---|---|---|---|
| 6,622,088 B2 * | 9/2003 | Hood | 701/517 |
| 7,739,031 B2 * | 6/2010 | Tengler et al. | 701/465 |
| 2005/0175226 A1 * | 8/2005 | Yamamoto | 382/124 |
| 2007/0294031 A1 | 12/2007 | Brinton et al. | |
| 2009/0157294 A1 * | 6/2009 | Geelen et al. | 701/200 |

OTHER PUBLICATIONS

Computer English translation of Japanese Patent No. 2000-309247, pp. 1-10.*
Office Action for Chinese counterpart application No. 200810191783.0 and partial English translation, Apr. 26, 2011.

* cited by examiner

*Primary Examiner* — Daniel Mariam
(74) *Attorney, Agent, or Firm* — Merchant & Gould P.C.

(57) ABSTRACT

A fingerprint-initiated navigating method is to be implemented using a navigating device, and includes the steps of: associating a $k^{th}$ set of fingerprint data with corresponding destination information, where k is an integer ranging from 1 to n, and n is not less than 1; receiving a fingerprint signal conforming with the $k^{th}$ set of fingerprint data; and showing a destination indicated by the destination information corresponding to the $k^{th}$ set of fingerprint data.

6 Claims, 5 Drawing Sheets

FINGERPRINT-INITIATED NAVIGATING METHOD, METHOD FOR LINKING A FINGERPRINT AND A NAVIGATION DESTINATION, AND NAVIGATING DEVICE

CROSS-REFERENCE TO RELATED APPLICATION

This application claims priority of Taiwanese Application No. 097149700, filed on Dec. 19, 2008.

BACKGROUND OF THE INVENTION

1. Field of the Invention

The present invention relates to a navigating device, more particularly to a navigating device capable of implementing a fingerprint-initiated navigating method.

2. Description of the Related Art

When a user of any one of existing navigating devices wants to set a navigation destination, he/she needs to input a desired address, or select a map location when the navigating device operates in a map mode, or select the navigation destination from preset destinations, i.e., my favorites. The user needs to manually operate the navigating device to set the navigation destination via the above-mentioned methods. It is unsafe for the user to manually operate the navigating device while driving a vehicle at the same time. Therefore, the user needs to park the vehicle to set the navigation destination, which is somewhat inconvenient.

Thus, there is a need for an improved navigating device that can be operated conveniently and safely by a user thereof even when the user is driving a vehicle.

SUMMARY OF THE INVENTION

Therefore, an object of the present invention is to provide a fingerprint-initiated navigating method.

Accordingly, a fingerprint-initiated navigating method of this invention is to be implemented using a navigating device, and comprises the steps of:

a) associating a $k^{th}$ set of fingerprint data with corresponding destination information, where k is an integer ranging from 1 to n, and n is not less than 1;

b) receiving a fingerprint signal conforming with the $k^{th}$ set of fingerprint data; and c) showing a destination indicated by the destination information corresponding to the $k^{th}$ set of fingerprint data.

Preferably, the fingerprint-initiated navigating method further comprises the step of:

upon receipt of a fingerprint signal that does not conform with the $k^{th}$ set of fingerprint data, requiring input of another fingerprint signal, and if said another fingerprint signal has a conforming set of fingerprint data, showing a destination indicated by the destination information corresponding to the conforming set of fingerprint data.

Preferably, the fingerprint-initiated navigating method further comprises, after step c), the steps of:

providing a user interface to enable confirming of the destination that is being shown;

if the destination that is being shown is to be changed, requiring input of another fingerprint signal, and if said another fingerprint signal has a conforming set of fingerprint data, showing a destination indicated by the destination information corresponding to the conforming set of fingerprint data; and if the destination that is being shown is confirmed, executing a navigating procedure for navigating to the confirmed destination.

Another object of the present invention is to provide a method for linking a fingerprint and a navigation destination to be implemented using a navigating device, the method comprising the steps of: receiving a fingerprint signal; analyzing the fingerprint signal to obtain a $k^{th}$ set of fingerprint data, and storing the $k^{th}$ set of fingerprint data; receiving destination information; and linking the $k^{th}$ set of fingerprint data to the destination information.

According to another aspect, the method for linking a fingerprint and a navigation destination comprises the steps of: pre-storing n sets of fingerprint data in a navigating device; receiving a fingerprint signal; analyzing the fingerprint signal and identifying whether the fingerprint signal conforms with one of the sets of fingerprint data pre-stored in the navigating device; if the fingerprint signal conforms with one of the sets of fingerprint data pre-stored in the navigating device, providing a user interface for setting a destination, and receiving destination information associated with the destination that was set through the user interface; and linking the destination information with the set of the fingerprint data that conforms with the fingerprint signal.

According to yet another aspect, the method for linking a fingerprint and a navigation destination comprises the steps of: pre-storing n sets of fingerprint data in a navigating device; and configuring the navigating device to operate in a map mode and to receive a command to execute a fingerprint-associated navigation setup procedure. The fingerprint-associated navigation setup procedure includes the steps of: receiving a fingerprint signal; analyzing the fingerprint signal and identifying whether the fingerprint signal conforms with one of the sets of fingerprint data pre-stored in the navigating device; and if the fingerprint signal conforms with one of the sets of fingerprint data pre-stored in the navigating device, linking a map location with the set of the fingerprint data that conforms with the fingerprint signal.

A further object of the present invention is to provide a navigating device. The navigating device of this invention comprises a fingerprint identifying system, a processing unit, and a navigating unit.

The fingerprint identifying system includes a fingerprint input module for enabling a user to input a fingerprint signal, an identification module coupled to the fingerprint input module and operable to identify the fingerprint signal, and a fingerprint database coupled to the identification module and storing n sets of fingerprint data. The identification module is further operable to output a conforming signal when the fingerprint signal inputted via the fingerprint input module is identified thereby as conforming with a $k^{th}$ one of the sets of fingerprint data stored in the fingerprint database.

The processing unit is coupled to the fingerprint identifying system and records links between each of the sets of fingerprint data stored in the fingerprint database and corresponding destination information. The processing unit is operable to output the destination information linked to the $k^{th}$ one of the sets of fingerprint data in response to the conforming signal received from the identification module of the fingerprint identifying system.

The navigating unit is coupled to the processing unit for navigating to a destination indicated by the destination information linked to the $k^{th}$ one of the sets of fingerprint data.

According to the present invention, by virtue of the link between a fingerprint and a navigation destination, the user of the navigating device of the present invention just needs to put one of his/her fingers on the fingerprint input module, and the navigating device will show a corresponding navigation destination associated with the finger.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
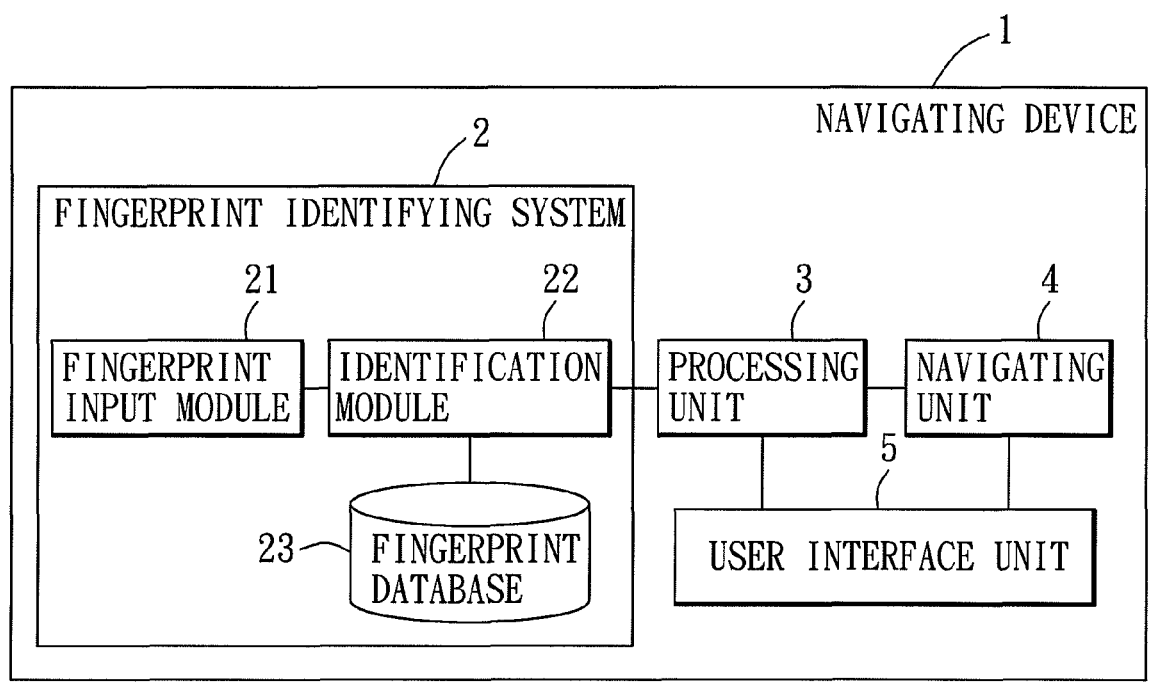
FIG. 1 is a system block diagram illustrating a preferred embodiment of a navigating device of the present invention.

Referring to FIG. 1, a preferred embodiment of a navigating device 1 of the present invention includes a fingerprint identifying system 2, a processing unit 3 coupled to the fingerprint identifying system 2, a navigating unit 4 coupled to the processing unit 3, and a user interface unit 5 coupled to the processing unit 3 and the navigating unit 4. The fingerprint identifying system 2 could be, but is not limited to, an optical scanner or a solid static fingerprint sensor. Since the optical scanner and the solid static fingerprint sensor are well known in the art, further details thereof will be omitted herein for the sake of brevity.

The fingerprint identifying system 2 includes a fingerprint input module 21 for enabling a user to input a fingerprint signal, an identification module 22 coupled to the fingerprint input module 21 and operable to identify the fingerprint signal, and a fingerprint database 23 coupled to the identification module 22 and storing n sets of fingerprint data, where n is an integer not less than 1. The identification module 22 is further operable to output a conforming signal when the fingerprint signal inputted via the fingerprint input module 21 is identified thereby as conforming with a $k^{th}$ one of the sets of fingerprint data stored in the fingerprint database 23, where k is an integer ranging from 1 to n. The above-mentioned fingerprint signal means a digital gray level image of a fingerprint. The identification module 22 identifies a plurality of feature points for the digital gray level image, and computes a set of fingerprint data according to the feature points and a known algorithm. Then, the set of fingerprint data is stored in the fingerprint database 23. Since techniques for identifying fingerprints are well known in the art, further details thereof will be omitted herein for the sake of brevity.

The processing unit 3 records links between each of the sets of fingerprint data stored in the fingerprint database 23 and corresponding destination information, and is operable to output the destination information associated to the $k^{th}$ one of the sets of fingerprint data in response to the conforming signal received from the identification module 22 of the fingerprint identifying system 2. The navigating unit 4 is operable to navigate to a destination indicated by the destination information associated to the $k^{th}$ one of the sets of fingerprint data.

In this embodiment, the user interface unit 5 includes, but is not limited to, a touch screen, a plurality of keys, and a speaker (not shown). The user interface unit 5 can also include an ordinary display screen cooperating with a keyboard in practice. One of the keys of the user interface unit 5 is operable to enable the navigating device 1 to execute a fingerprint-associated navigation setup procedure. It is noted that, the means for enabling execution of the fingerprint-associated navigation setup procedure can also be a short cut on the screen of the user interface unit 5.

Figure 2:
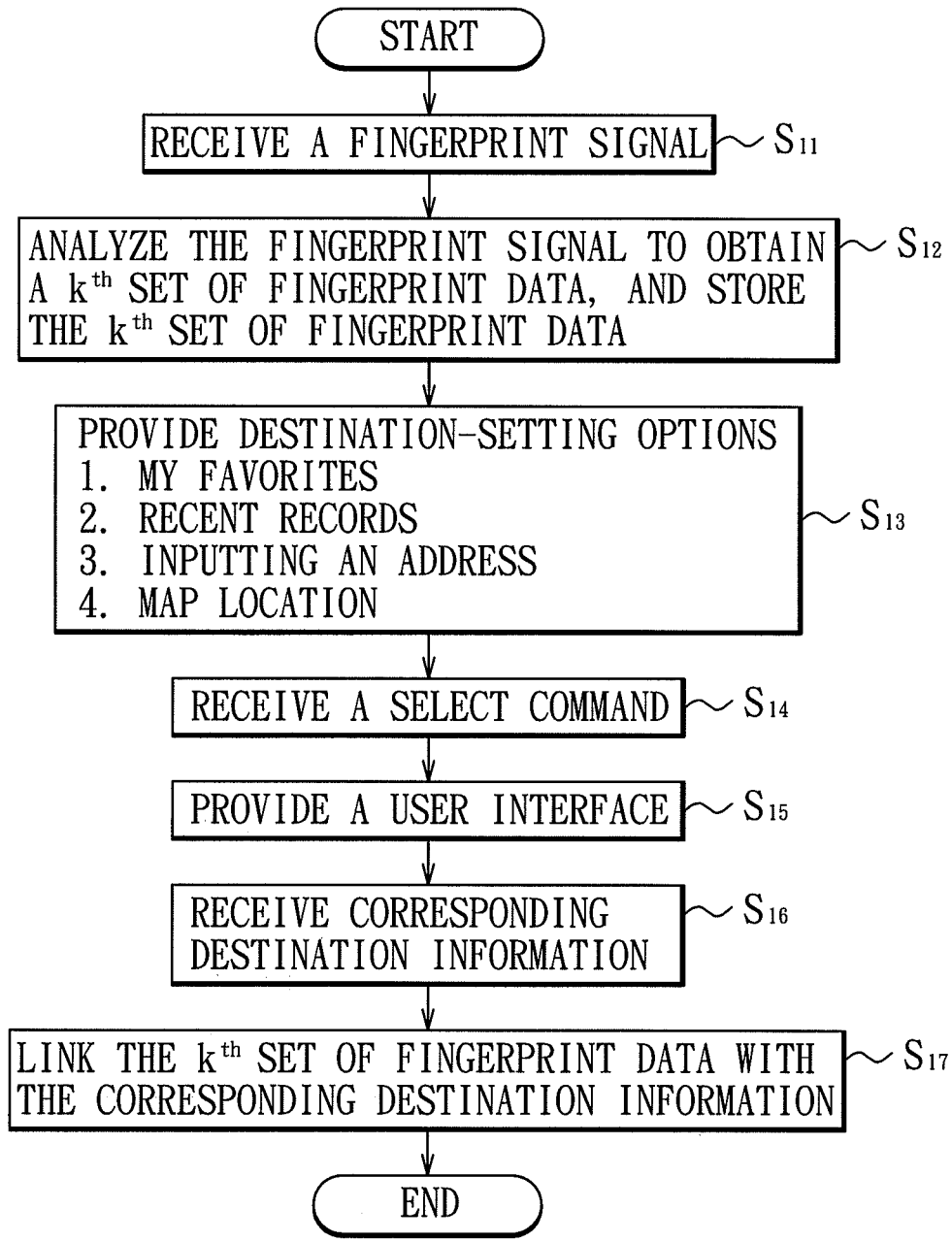
FIG. 2 is a flow chart illustrating a first preferred embodiment of a method for linking a fingerprint and a navigation destination of the present invention.

FIG. 2 shows a first preferred embodiment of a method for linking a fingerprint and a navigation destination of the present invention. When the key for enabling execution of the fingerprint-associated navigation setup procedure is pressed, the navigating device 1 implements the following steps according to this embodiment.

Step ($S_{11}$) is to receive a fingerprint signal via the fingerprint input module 21, and send the fingerprint signal to the identification module 22.

Step ($S_{12}$) is to analyze the fingerprint signal to obtain a $k^{th}$ set of fingerprint data via the identification module 22, and store the $k^{th}$ set of fingerprint data in the fingerprint database 23, where k=1~n, n≧1. For instance, an owner of the navigating device 1 sets fingerprints of five fingers of his/her right hand as the first to fifth sets of fingerprint data, and fingerprints of five fingers of his/her spouse are defined as the sixth to tenth sets of fingerprint data, thus n=10, k=1~10. Of course, the number of the sets of fingerprint data is not limited to the above example. The navigating device 1 can be also designed to permit ten sets of fingerprint data only.

A plurality of destination-setting options are provided in step ($S_{13}$). The method of this embodiment provides the destination-setting options of my favorites, recent records, inputting a desired address, and setting a map location as a destination.

Step ($S_{14}$) is to receive a select command indicating a selected one of the destination-setting options via the user interface unit 5.

According to the select command and the selected one of the destination-setting options, the navigating device 1 provides a user interface for setting a destination in step ($S_{15}$). For instance, when a user inputs a select command indicating the destination-setting option of "my favorites", the navigating device 1 provides a user interface for selecting sub-options of the pre-set "my favorites", such as "go home", "office", "son's kindergarten", etc. When the user inputs a select command indicating the destination-setting option of inputting a desired address, the navigating device 1 provides a user interface, i.e. a blank, for inputting the desired address. When the user inputs a select command indicating the destination-setting option of setting a map location as a destination, the navigating device 1 shows a map to enable the user to select a map location as a destination.

Step ($S_{16}$) is to receive corresponding destination information via the user interface unit 5. The corresponding destination information is associated with the destination set through the user interface provided in step ($S_{15}$), and contains an address selected or inputted by the user.

Then, in step ($S_{17}$), the processing unit 3 operates to link the $k^{th}$ set of fingerprint data with the corresponding destination information, and records the link therebetween. The fingerprint-associated navigation setup procedure ends.

Figure 3:
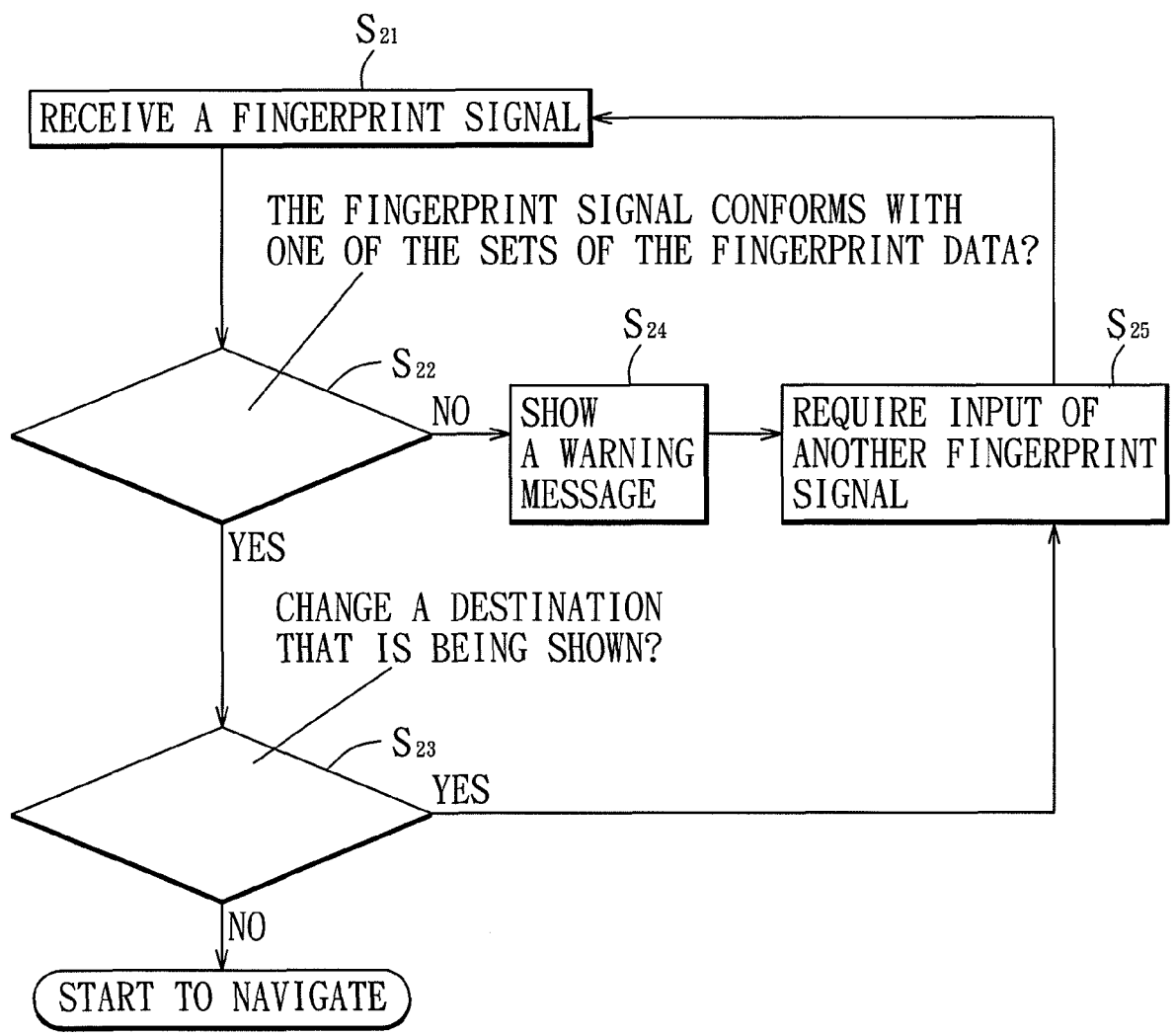
FIG. 3 is a flow chart illustrating a fingerprint-initiated navigating method of the present invention.

When the sets of fingerprint data are linked with the corresponding destination information, the user can use a fingerprint-initiated navigating function of the navigating device 1. Referring to FIG. 3, a fingerprint-initiated navigating method of the present invention includes the following steps.

Step ($S_{21}$) is to receive a fingerprint signal when the navigating device 1 operates in a general mode. The user puts one of his/her fingers on the fingerprint input module 21 to input the fingerprint signal.

In step ($S_{22}$), the identification module 22 analyzes the fingerprint signal, and compares the fingerprint signal with the sets of fingerprint data stored in the fingerprint database 23. When the fingerprint signal obtained in step ($S_{22}$) conforms with, for example, a $k^{th}$ one of the sets of fingerprint data stored in the fingerprint database 23, the flow goes to step ($S_{23}$). On the other hand, when the fingerprint signal obtained in step ($S_{22}$) does not conform with any one of the sets of fingerprint data stored in the fingerprint database 23, a warning message in shown on the screen of the user interface unit 5 and the speaker of the user interface unit 5 plays a warning sound in step ($S_{24}$). Then, the navigating device 1 requires input of another fingerprint signal in step ($S_{25}$).

In step ($S_{23}$), the processing unit 3 receives the conforming signal from the identification module 22, and outputs the destination information linked to the $k^{th}$ one of the sets of fingerprint data according to the links recorded beforehand. The user interface unit 5 shows a destination indicated by the destination information corresponding to the $k^{th}$ set of fingerprint data. In order to conveniently change a destination attributed to a user error, a user interface to enable confirming of the destination is also provided. If the destination that is being shown is to be changed, the flow goes to step ($S_{25}$). If the destination that is being shown is confirmed, the navigating unit 4 of the navigating device 1 executes a navigating procedure for navigating to the confirmed destination.

Figure 4:
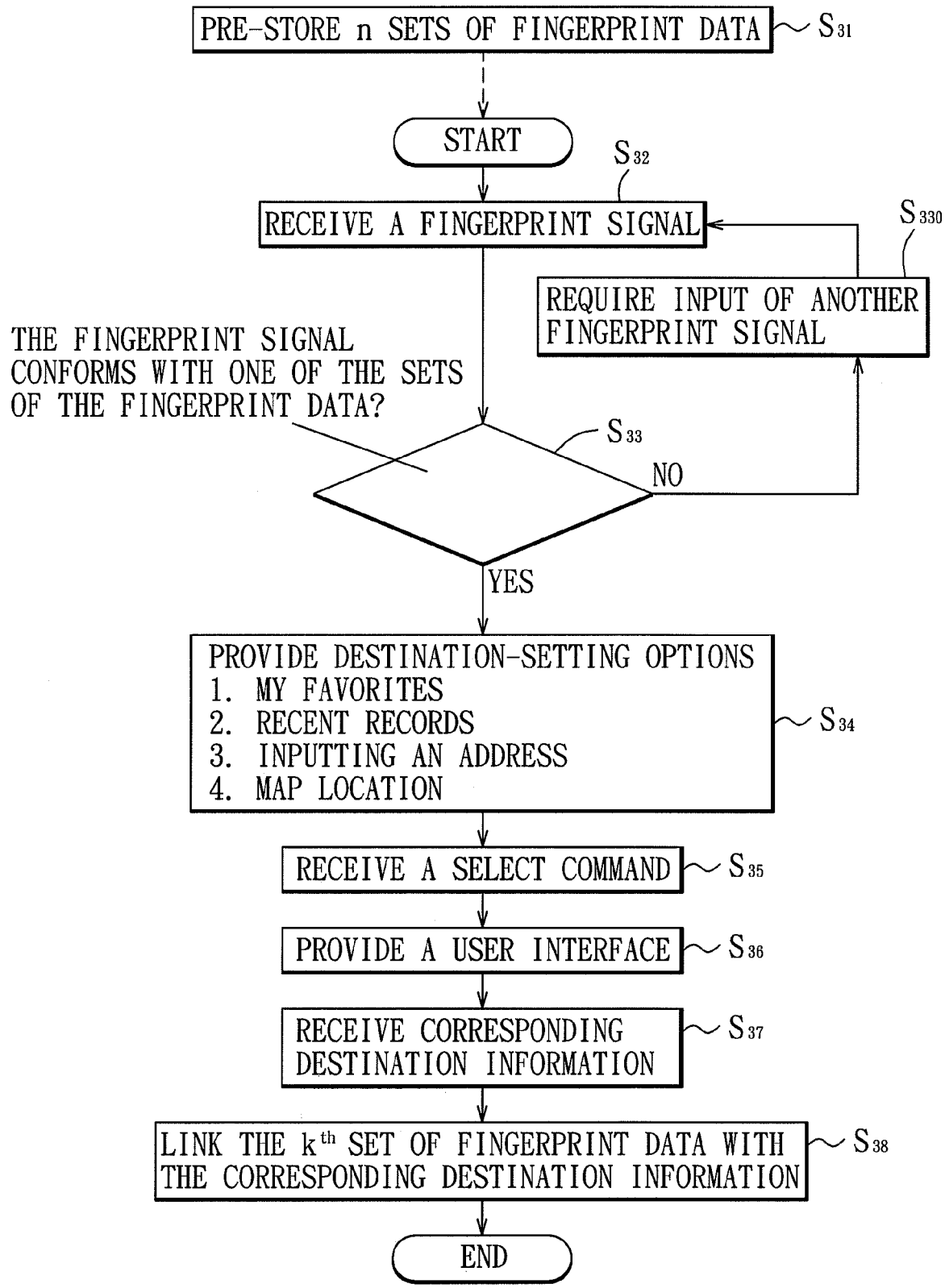
FIG. 4 is a flow chart illustrating a second preferred embodiment of the method for linking a fingerprint and a navigation destination of the present invention.

Referring to FIGS. 1 and 4, a second preferred embodiment of the method for linking a fingerprint and a navigation destination of the present invention provides another fingerprint-associated navigation setup procedure different from the first preferred embodiment. Hardware of the navigating device 1 and the fingerprint-initiated navigating method are the same as those described hereinabove.

The method for linking a fingerprint and a navigation destination of this embodiment includes the following steps.

In step ($S_{31}$) n sets of fingerprint data, i.e., first to $n^{th}$ sets of fingerprint data, are pre-stored in the navigating device 1. This step is same as steps ($S_{11}$) and ($S_{12}$) of the first embodiment.

Step ($S_{32}$) is to receive a fingerprint signal via the fingerprint input module 21.

In step ($S_{33}$), the identification module 22 analyzes the fingerprint signal, and compares the fingerprint signal with the first to $n^{th}$ sets of fingerprint data pre-stored in the fingerprint database 23. When the fingerprint signal obtained in step ($S_{32}$) conforms with, for example, a $k^{th}$ one of the sets of fingerprint data pre-stored in the fingerprint database 23, the flow goes to step ($S_{34}$). On the other hand, when the fingerprint signal obtained in step ($S_{32}$) does not conform with any one of the sets of fingerprint data stored in the fingerprint database 23, a warning message in shown via the user interface unit 5 to require input of another fingerprint signal in step ($S_{330}$).

Step ($S_{34}$) is to provide a plurality of destination-setting options including my favorites, recent records, most frequently used destinations, inputting a desired address, setting a map location as a destination, etc.

Step ($S_{35}$) is to receive a select command indicating a selected one of the destination-setting options.

According to the select command and the selected one of the destination-setting options, the navigating device 1 provides a user interface for setting a destination in step ($S_{36}$).

Step ($S_{37}$) is to receive corresponding destination information associated with the destination that was set through the user interface.

Finally, instep ($S_{38}$), the processing unit 3 operates to link the $k^{th}$ set of fingerprint data with the corresponding destination information, and records the link therebetween. The fingerprint-associated navigation setup procedure ends.

Figure 5:
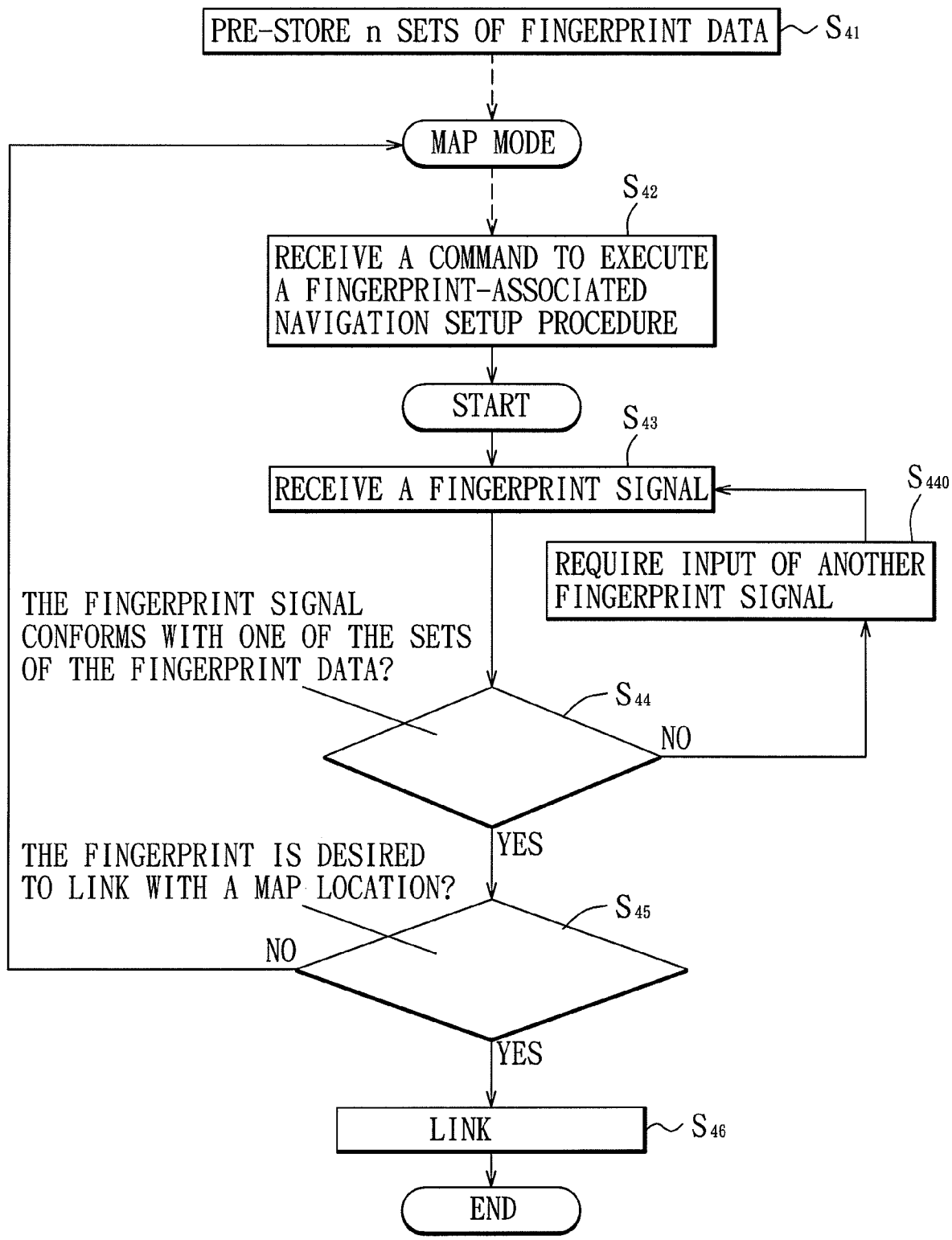
FIG. 5 is a flow chart illustrating a third preferred embodiment of the method for linking a fingerprint and a navigation destination of the present invention.

Referring to FIGS. 1 and 5, a third preferred embodiment of the method for linking a fingerprint and a navigation destination of the present invention provides yet another fingerprint-associated navigation setup procedure different from the first and second preferred embodiments.

In this embodiment, the method for linking a fingerprint and a navigation destination includes the following steps.

In step ($S_{41}$), n sets of fingerprint data are pre-stored in the navigating device 1.

Step ($S_{42}$) is to configure the navigating device 1 to operate in a map mode and to receive a command to execute the fingerprint-associated navigation setup procedure. The command can be configured as selecting an option via the touch screen of the user interface unit 5 or pressing a button.

Step ($S_{43}$) is to receive a fingerprint signal via the fingerprint input module 21.

In step ($S_{44}$), the identification module 22 analyzes the fingerprint signal, and compares the fingerprint signal with the sets of fingerprint data stored in the fingerprint database 23. When the fingerprint signal obtained in step ($S_{44}$) conforms with, for example, a $k^{th}$ one of the sets of fingerprint data stored in the fingerprint database 23, the flow goes to step ($S_{45}$). On the other hand, when the fingerprint signal obtained in step ($S_{44}$) does not conform with any one of the sets of fingerprint data stored in the fingerprint database 23, the navigating device 1 requires input of another fingerprint signal in step ($S_{440}$).

In step ($S_{45}$), the user interface unit 5 provides an option to enable the user to confirm whether a fingerprint associated with the fingerprint signal that conforms with the $k^{th}$ one of the sets of fingerprint data is desired to link with a map location. When the user desires to link the fingerprint with a map location, the flow goes to step ($S_{46}$). Otherwise, the fingerprint-associated navigation setup procedure ends, and the navigating device 1 operates in the map mode. The above-mentioned map location can be a location pre-selected by the user when the navigating device 1 operates in the map mode.

In step ($S_{46}$), the processing unit 3 operates to link the map location with the $k^{th}$ set of fingerprint data that conforms with the fingerprint signal, and records the link therebetween. The fingerprint-associated navigation setup procedure ends.

In sum, the present invention provides various methods for linking a fingerprint and a navigation destination. The user of the navigating device 1 can operate the navigating device 1 to execute the fingerprint-associated navigation setup procedure easily and conveniently. After finishing the fingerprint-associated navigation setup procedure, the user just needs to put a finger on the fingerprint input module 21, and then the navigating device 1 will show a pre-set navigation destination corresponding to a set of fingerprint data that conforms with the fingerprint of the finger.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A fingerprint-initiated navigating method to be implemented using a navigating device, said fingerprint-initiated navigating method comprising the steps of:
  a) associating a $k^{th}$ set of fingerprint data with corresponding destination information, where k is an integer ranging from 1 to n, and n is not less than 1, step a) including the following sub-steps of,
    pre-storing n sets of fingerprint data in the navigating device,
    configuring the navigating device to operate in a map mode, where the navigating device shows a map to enable a user to select a map location, and to receive a command to execute a fingerprint-associated navigation setup procedure, and
    while the navigating device executes the fingerprint-associated navigation setup procedure,
      receiving a setup fingerprint signal,
      analyzing the setup fingerprint signal and identifying whether the setup fingerprint signal conforms with one of the n sets of fingerprint data pre-stored in the navigating device, and
      if the setup fingerprint signal conforms with one of the n sets of fingerprint data pre-stored in the navigating device, linking the map location with the set of the fingerprint data that conforms with the setup fingerprint signal;
  b) receiving a navigating fingerprint signal conforming with the $k^{th}$ set of fingerprint data; and
  c) showing a destination indicated by the destination information corresponding to the $k^{th}$ set of fingerprint data.

2. The fingerprint-initiated navigating method as claimed in claim 1, further comprising the step of:
  upon receipt of a navigating fingerprint signal that does not conform with the $k^{th}$ set of fingerprint data, requiring input of another navigating fingerprint signal, and if said another navigating fingerprint signal has a conforming set of fingerprint data, showing a destination indicated by the destination information corresponding to the conforming set of fingerprint data.

3. The fingerprint-initiated navigating method as claimed in claim 1, further comprising, after step c), the steps of:
  providing a user interface to enable confirming of the destination that is being shown;
  if the destination that is being shown is to be changed, requiring input of another fingerprint signal, and if said another fingerprint signal has a conforming set of fingerprint data, showing a destination indicated by the destination information corresponding to the conforming set of fingerprint data; and
  if the destination that is being shown is confirmed, executing a navigating procedure for navigating to the confirmed destination.

4. A method for linking a fingerprint and a navigation destination to be implemented using a navigating device, said method comprising the steps of:
  pre-storing n sets of fingerprint data in the navigating device, where n is an integer not less than 1;
  configuring the navigating device to operate in a map mode, where the navigating device shows a map to enable a user to select a map location, and to receive a command to execute a fingerprint-associated navigation setup procedure; and
  while the navigating device executes the fingerprint-associated navigation setup procedure,
    receiving a setup fingerprint signal,
    analyzing the setup fingerprint signal and identifying whether the setup fingerprint signal conforms with one of the n sets of fingerprint data pre-stored in the navigating device, and
    if the setup fingerprint signal conforms with one of the n sets of fingerprint data pre-stored in the navigating device, linking the map location with the set of the fingerprint data that conforms with the setup fingerprint signal.

5. A navigating device comprising:
  a fingerprint identifying system including
    a fingerprint input module for enabling a user to input a fingerprint signal,
    an identification module coupled to said fingerprint input module and operable to identify the fingerprint signal, and
    a fingerprint database coupled to said identification module and storing n sets of fingerprint data, where n is an integer not less than 1,
    said identification module being further operable to output a conforming signal when the fingerprint signal inputted via said fingerprint module is identified thereby as conforming with a $k^{th}$ one of the n sets of fingerprint data stored in said fingerprint database, where k ranges from 1 to n;
  a processing unit coupled to said fingerprint identifying system and recording links between each of the n sets of fingerprint data stored in said fingerprint database and corresponding destination information, said processing unit being operable to output the destination information linked to the $k^{th}$ one of the n sets of fingerprint data in response to the conforming signal received from said identification module of said fingerprint identifying system; and
  a navigating unit coupled to said processing unit for navigating to a destination indicated by the destination information linked to the $k^{th}$ one of the n sets of fingerprint data;
  wherein the $k^{th}$ one of the n sets of fingerprint data is linked to the destination information by
    pre-storing the n sets of fingerprint data in said fingerprint database,
    configuring said navigating device to operate in a map mode, where said navigating device shows a map to enable the user to select a map location, and to receive a command to execute a fingerprint-associated navigation setup procedure, and
    while said navigating device executes the fingerprint-associated navigation setup procedure,
      receiving a setup fingerprint signal from the user via said fingerprint input module
      configuring said identification module to analyze the setup fingerprint signal and to identify whether the setup fingerprint signal conforms with one of the n sets of fingerprint data pre-stored in said fingerprint database, and
      if the setup fingerprint signal conforms with one of the n sets of fingerprint data re-stored in said fingerprint database, confirming said processing unit to link the may location with the set of the fingerprint data that conforms with the setup fingerprint signal and to record the link therebetween.

6. The navigating device as claimed in claim 5, further comprising a user interface unit coupled to said processing unit and said navigating unit, said identification module being further operable to output a non-conforming signal when the setup fingerprint signal inputted via said fingerprint input module is identified thereby as not conforming with any one of the n sets of fingerprint data stored in said fingerprint database, said processing unit being responsive to the non-conforming signal to control said user interface unit so as to output a message for prompting a user to input another setup fingerprint signal.

* * * * *